No. 792,157. PATENTED JUNE 13, 1905.
J. F. O'CONNOR.
ANTIFRICTION SIDE BEARING FOR RAILWAY CARS.
APPLICATION FILED APR. 6, 1905.
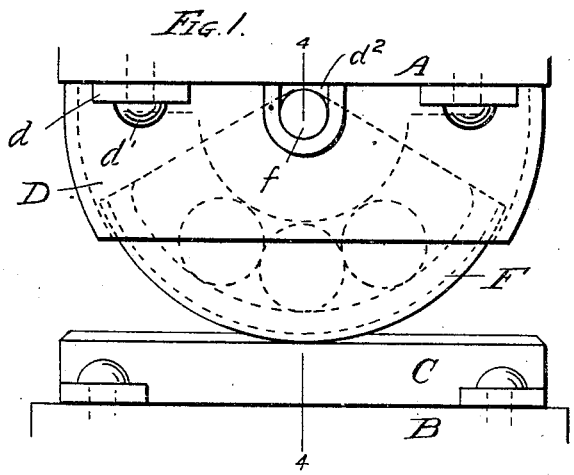
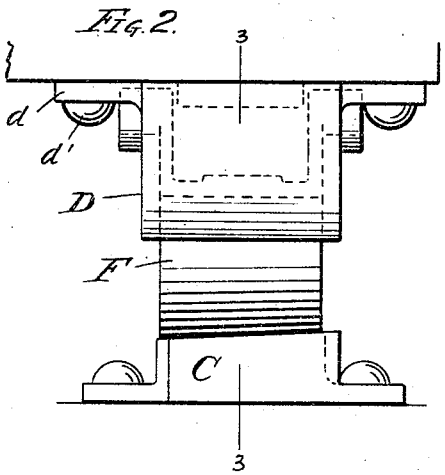
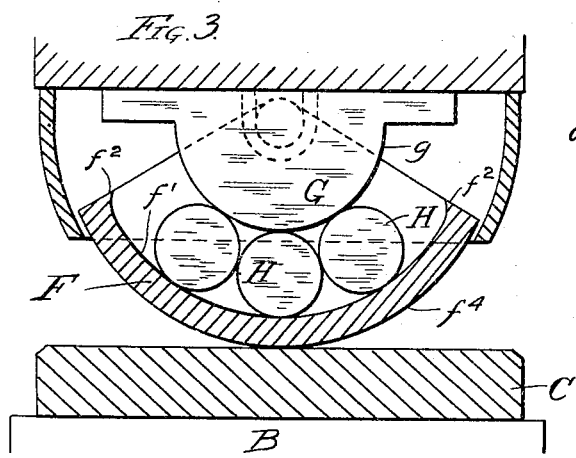
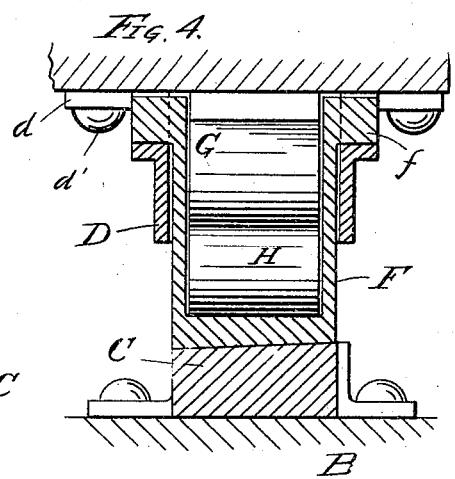
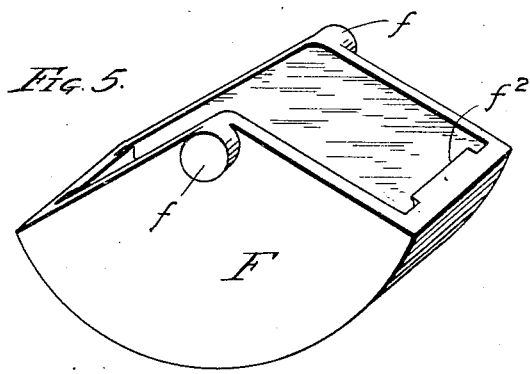
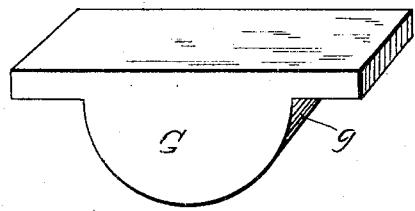
WITNESSES:
F. B. Townsend
Wm. Geiger
INVENTOR.
John F. O'Connor
BY Munday, Evarts & Adcock
his ATTORNEYS No. 792,157.

Patented June 13, 1905.

UNITED STATES PATENT OFFICE.

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

ANTIFRICTION SIDE BEARING FOR RAILWAY-CARS.

SPECIFICATION forming part of Letters Patent No. 792,157, dated June 13, 1905.

Application filed April 6, 1905. Serial No. 254,220.

*To all whom it may concern:*

Be it known that I, JOHN F. O'CONNOR, a citizen of the United States, residing in Chicago, in the county of Cook and State of Illinois, have invented a new and useful Improvement in Antifriction Side Bearings for Railway-Cars, of which the following is a specification.

My invention relates to improvements in antifriction side bearings for railway-cars.

The object of my invention is to provide an antifriction side bearing of a simple, strong, efficient, and durable construction.

My invention consists in the means I employ to practically accomplish this result—that is to say, it consists, in connection with a body-bolster and truck-bolster, of a cage secured to the body-bolster, a hub within the cage and having a curved or semicylindrical lower peripheral face, a cradle having studs pivotally connecting it with the cage and having a curved inner face and a plurality of antifriction-rollers in the cradle and interposed between it and the hub and affording an antifriction as well as an extended bearing between the cradle and hub, and a bottom plate or tread-plate secured to the truck-bolster and upon which the cradle rocks as the bolsters swing or move in respect to each other.

My invention also consists in the novel construction of parts and devices and in the novel combinations of parts and devices herein shown or described.

In the accompanying drawings, forming a part of this specification, Figure 1 is a side elevation of an antifriction side bearing embodying my invention. Fig. 2 is a front elevation. Fig. 3 is a vertical section on line 3 3 of Fig. 2. Fig. 4 is a section on line 4 4 of Fig. 1. Fig. 5 is a detail perspective view of the cradle, and Fig. 6 is a detail perspective view of the hub.

In the drawings, A represents the body-bolster of a railway-car, and B the truck-bolster, and C a bottom plate or tread-plate secured to the truck-bolster, the same being preferably slightly curved about the king-bolt or center plate of the car as the center and its upper or tread face being also preferably slightly inclined to correspond to the slightly-conical face of the rocking cradle.

D is a cage or hollow shell having flanges $d$ for securing the same to the body-bolster A by bolts $d'$. The cage D is furnished with U-shaped slots or bearings $d^2$ to receive the pivot studs or trunnions $f$ of the cradle F.

G is a hub bearing against the body-bolster within the cage D, the same having a curved or semicylindric lower or bearing face $g$. The cradle F is sector-shaped and has an inner bearing-face $f'$, corresponding in curvature to the bearing-face $g$ of the hub G.

H H H are a series of antifriction-rollers interposed between the hub G and cradle F and serving to transmit the thrust on the cradle F to the hub G. To keep the rollers H in place in their way between the hub G and cradle F, the cradle F is provided with inwardly-extending projections $f^2 f^2$ at its extreme ends, so that the rollers H cannot become displaced. The trunnions $f$ of the hollow rocker or cradle F are thus relieved from strain or pressure, as pressure between the cradle F and bottom plate or tread-plate C is transmitted through the rollers H to the hub G. While the outer periphery $f^4$ of the cradle is slightly conical, as indicated in the drawings, to conform to the inclined tread of the bottom plate C and its circular movement about the king-bolt as the center, the antifriction-rollers H are cylindrical, as well as the curved bearing-surface $g$ of the hub G and the internal bearing-surface $f'$ of the cradle F. This greatly simplifies the construction of the side bearing, as the rollers H may be two cylinders and cut from a rod in the ordinary manner, while at the same time the movement of the parts is a true rolling one and free from any sliding friction. The hub G is preferably loose within the cage D and not rigidly secured to the body-bolster. This causes the hub G to rest normally on the rollers H and tends to lock the cradle from oscillation when the car tips, and the cradle is free from contact with the truck-bolster, thus insuring the parts being maintained in normal position when the cradle and truck-bolster again come in contact.

I claim—

1. In a side bearing, the combination with the body-bolster and truck-bolster, of a bottom or tread plate secured to the truck-bolster, a cage secured to the body-bolster, a hub within the cage provided with a curved bearing-face, a cradle pivotally connected to the cage and having an inner curved bearing-face and antifriction-rollers interposed between the cradle and the hub, substantially as specified.

2. In a side bearing, the combination with a cage, of a hub within the cage having a curved bearing-face, a rocking cradle having an inner curved bearing-face and rollers interposed between the cradle and the hub, substantially as specified.

3. In a side bearing, the combination with a bottom plate secured to the truck-bolster, of a cage secured to the body-bolster, a hub within the cage, a cradle or hollow rocker, and antifriction-rollers interposed between the hub and the rocker, substantially as specified.

4. In a side bearing, the combination with a hub having a curved external bearing-face, of a cradle having a curved internal bearing-face, rollers interposed between the cradle and the hub and a tread or bottom plate upon which the cradle bears, substantially as specified.

5. The combination with a tread or bottom plate, of a hollow rocker or cradle, a hub having an external curved bearing-face, and rollers between the hub and cradle, substantially as specified.

6. In a side bearing, the combination with a bottom plate having an inclined tread, of a hollow rocker or cradle having a conical external bearing face or periphery, and an internal cylindrical bearing-face, a hub having an external cylindric bearing-face and cylindric rollers between the hub and cradle, substantially as specified.

7. The combination with a tread or bottom plate, of a hollow rocker or cradle, a hub having an external curved bearing-face, and rollers between the hub and cradle, the hub being normally free from the body-bolster and resting on the rollers, substantially as specified.

JOHN F. O'CONNOR.

Witnesses:
H. M. MUNDAY,
WILLIAM A. GEIGER.